US012319023B2

(12) United States Patent
Suzuki et al.

(10) Patent No.: US 12,319,023 B2
(45) Date of Patent: Jun. 3, 2025

(54) SLITTER DEVICE, SLITTER-HEAD POSITIONING METHOD, AND BOX MAKING MACHINE

(71) Applicant: MITSUBISHI HEAVY INDUSTRIES MACHINERY SYSTEMS, LTD., Hyogo (JP)

(72) Inventors: Yasunari Suzuki, Hyogo (JP); Masayoshi Tanchi, Hyogo (JP); Mitsuhiro Nadachi, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 118 days.

(21) Appl. No.: 17/800,941

(22) PCT Filed: Jan. 28, 2021

(86) PCT No.: PCT/JP2021/003088
§ 371 (c)(1),
(2) Date: Aug. 19, 2022

(87) PCT Pub. No.: WO2021/171895
PCT Pub. Date: Sep. 2, 2021

(65) Prior Publication Data

US 2023/0073751 A1 Mar. 9, 2023

(30) Foreign Application Priority Data

Feb. 28, 2020 (JP) ................................ 2020-033731

(51) Int. Cl.
*B31B 50/20* (2017.01)
*B31B 50/00* (2017.01)
(Continued)

(52) U.S. Cl.
CPC ............ *B31B 50/20* (2017.08); *B31B 50/006* (2017.08); *B31B 50/04* (2017.08); *B31B 50/25* (2017.08);
(Continued)

(58) Field of Classification Search
CPC ....... B31B 50/20; B31B 50/25; B31B 50/006; B31B 50/04; B31B 50/88; B31B 2100/00;
(Continued)

(56) References Cited

U.S. PATENT DOCUMENTS 4,261,239 A 4/1981 Toboshi et al.
9,138,905 B2 * 9/2015 Daul .................... B26D 7/2635
(Continued)

FOREIGN PATENT DOCUMENTS

JP S5579134 A 6/1980
JP 56083397 U 7/1981
(Continued)

OTHER PUBLICATIONS

International Search Report and Written Opinion of International Application No. PCT/JP2021/003088 mailed Apr. 13, 2021; 11pp.

*Primary Examiner* — Sameh Tawfik
(74) *Attorney, Agent, or Firm* — HAUPTMAN HAM, LLP

(57) ABSTRACT

A slitter device includes an upper rotary shaft and a lower rotary shaft that are supported so as to be able to rotate. An upper slitter head that is supported by the upper rotary shaft so as to be able to rotate therewith. A lower slitter head that is supported by the lower rotary shaft so as to be able to rotate therewith and that is disposed on one side of the upper slitter head in the axial direction of the lower rotary shaft. An upper movement device that can move the upper slitter head in the axial direction of the upper rotary shaft. A lower movement device can move the lower slitter head in the
(Continued)

axial direction of the lower rotary shaft. A control device that controls movement of the upper movement device and the lower movement device.

11 Claims, 8 Drawing Sheets

(51) Int. Cl.

| | |
|---|---|
| ***B31B 50/04*** | (2017.01) |
| ***B31B 50/25*** | (2017.01) |
| ***B31B 50/88*** | (2017.01) |
| *B31B 100/00* | (2017.01) |
| *B31B 120/70* | (2017.01) |

(52) U.S. Cl.
CPC .......... *B31B 50/88* (2017.08); *B31B 2100/00* (2017.08); *B31B 2120/70* (2017.08)

(58) Field of Classification Search
CPC ...... B31B 2120/70; B62D 5/023; B62D 1/24; B62D 1/00; B62D 3/00
USPC ............................................................ 493/55
See application file for complete search history.

(56) References Cited

U.S. PATENT DOCUMENTS

| | | | | |
|---|---|---|---|---|
| 2003/0019338 | A1 * | 1/2003 | Berne | B24B 1/00<br>83/13 |
| 2003/0205117 | A1 * | 11/2003 | Flaherty | B23D 35/007<br>83/507 |
| 2004/0221699 | A1 * | 11/2004 | Adachi | B26D 7/12<br>76/85 |
| 2009/0062098 | A1 * | 3/2009 | Inoue | B26D 7/2642<br>493/442 |
| 2010/0288142 | A1 * | 11/2010 | Sugimoto | B41F 5/24<br>493/55 |
| 2021/0178720 | A1 * | 6/2021 | Iori | B31B 50/256 |
| 2023/0373185 | A1 * | 11/2023 | Hara | B31B 50/624 |

FOREIGN PATENT DOCUMENTS

| | | | |
|---|---|---|---|
| JP | S5755035 | A | 4/1982 |
| JP | S591190 | A | 1/1984 |
| JP | H0259295 | A | 2/1990 |
| JP | H02124293 | A | 5/1990 |
| JP | H04201195 | A | 7/1992 |
| JP | 2004330351 | A | 11/2004 |
| WO | 2019116578 | A1 | 6/2019 |

* cited by examiner

SLITTER DEVICE, SLITTER-HEAD POSITIONING METHOD, AND BOX MAKING MACHINE

RELATED APPLICATIONS

The present application is a National Phase of International Application Number PCT/JP2021/003088 filed Jan. 28, 2021, and claims priority of Japanese Application Number 2020-033731 filed Feb. 28, 2020.

TECHNICAL FIELD

The present disclosure relates to a slitter device that performs a cutting process at an end portion of a sheet material such as a corrugated board, a slitter-head positioning method, and a box making machine provided with the slitter device.

BACKGROUND ART

A box making machine manufactures a box body (corrugated box) by processing a sheet material (for example, a corrugated board). The box making machine is configured of a sheet feeding section, a printing section, a slotter creaser section, a die cutting section, a folding section, a counter-ejector section, and the like. The sheet feeding section sends out the corrugated boards stacked on a table one by one and sends them to the printing section at a constant speed. The printing section has a plurality of printing units and performs printing on the corrugated board. The slotter creaser section forms a creasing line to be a folding line on the corrugated board, cuts the end portion of the corrugated board, and performs processes of a groove forming a flap and a gluing margin strip for joining. The die cutting section performs a punching process of a hand hole or the like on the corrugated board. The folding section applies glue to the gluing margin strip of the corrugated board, folds the corrugated board along the creasing line, and joins the gluing margin strips to manufacture a flat corrugated box. The counter-ejector section stacks corrugated boxes, sorts them into a predetermined number of batches, and discharges them.

In such a box making machine, the slotter creaser section has a slitter device for cutting the end portion of the corrugated board. The slitter device is configured of an upper slitter head and a lower slitter head. A blade is fixed to an outer peripheral portion of each of the upper slitter head and the lower slitter head, and each blade is maintained in a pressed state in a thickness direction. Therefore, when the sheet material is transferred between the upper slitter head and the lower slitter head which are relatively rotated, the end portion of the corrugated board is cut by each blade of the upper slitter head and the lower slitter head.

The slitter device is maintained in a state where each blade of the upper slitter head and the lower slitter head is pressed by a predetermined pressure in the thickness direction, a corrugated board is supplied between the blade of the upper slitter head and the blade of the lower slitter head, and the end portion is cut. That is, the slitter device needs to maintain the blades of the upper slitter head and the lower slitter head in a state of being pressed by a predetermined pressure while cutting the corrugated board. As such a technique, for example, there is one described in the following PTL 1. The slitter device described in PTL 1 positions a pair of upper and lower blades facing each other at a cutting position, moves one of the blades to the cutting position or higher to align the blade with the other blade, and applies a desired pressing torque to one of the blades with respect to the other blade to apply a blade alignment pressure between the two blades to perform the cutting.

CITATION LIST

Patent Literature

[PTL 1] Japanese Unexamined Patent Application Publication No. 04-201195

SUMMARY OF INVENTION

Technical Problem

In the conventional slitter device described above, a pair of upper and lower blades are positioned facing each other at the cutting position, and then one blade applies a desired pressing torque to the other blade. In this case, since the pair of upper and lower blades cut a corrugated board S while rotating the aligned blades together with each other, wear occurs in the thickness direction. As wear progresses, even if the pair of upper and lower blades are positioned so as to face the cutting position, there is a problem that the cutting position shifts by an amount of the progressed wear.

The present disclosure has been made to solve the above-mentioned problems, and an object of the present disclosure is to provide a slitter device, a slitter-head positioning method, and a box making machine for improving the positioning accuracy of the slitter head.

Solution to Problem

A slitter device of the present disclosure for achieving the above object includes an upper rotary shaft and a lower rotary shaft that are rotatably supported; an upper slitter head that is fixed to the upper rotary shaft; a lower slitter head that is fixed to the lower rotary shaft and is disposed on one side of the lower rotary shaft in an axial direction with respect to the upper slitter head; an upper movement device that is configured to move the upper slitter head in the axial direction of the upper rotary shaft; a lower movement device that is configured to move the lower slitter head in the axial direction of the lower rotary shaft; and a control device that moves and positions one of the upper slitter head and the lower slitter head to a preset cutting position by any one of the upper movement device and the lower movement device, and then moves and positions the other of the upper slitter head and the lower slitter head to a pressing position where the other of the upper slitter head and the lower slitter head is pressed against the one of the upper slitter head and the lower slitter head by the other of the upper movement device and the lower movement device.

Further, a slitter-head positioning method of the present disclosure includes a step of moving any one of an upper slitter head and a lower slitter head in an axial direction of a rotary shaft to position the upper slitter head and the lower slitter head at a preset cutting position; and a step of moving and positioning the other of the upper slitter head and the lower slitter head to a pressing position where the other of the upper slitter head and the lower slitter head is pressed against the one of the upper slitter head and the lower slitter head.

Further, a box making machine of the present disclosure includes a sheet feeding section that supplies a sheet; a printing section that performs printing on the sheet; a slotter creaser section that performs an end portion cutting process, a creasing line process, and a groove cutting process on the sheet; a folding section that forms a box body by folding the sheet and joining end portions; and a counter-ejector section that discharges every predetermined number of the box bodies after stacking the box bodies while counting the box bodies, in which the slotter creaser section has the slitter device.

Advantageous Effects of Invention

According to the slitter device, the slitter-head positioning method, and the box making machine of the present disclosure, the positioning accuracy of the slitter head can be improved.

DESCRIPTION OF EMBODIMENTS

Preferred embodiments of the present disclosure will be described in detail below with reference to the drawings. It should be noted that the present disclosure is not limited to the embodiment, and when there are a plurality of embodiments, the present embodiment also includes a combination of the respective embodiments. Further, the configuration elements in the embodiment include those that can be easily assumed by those skilled in the art, those that are substantially the same, that are, those in a so-called equal range.

[Configuration of Box Making Machine]

Figure 1:
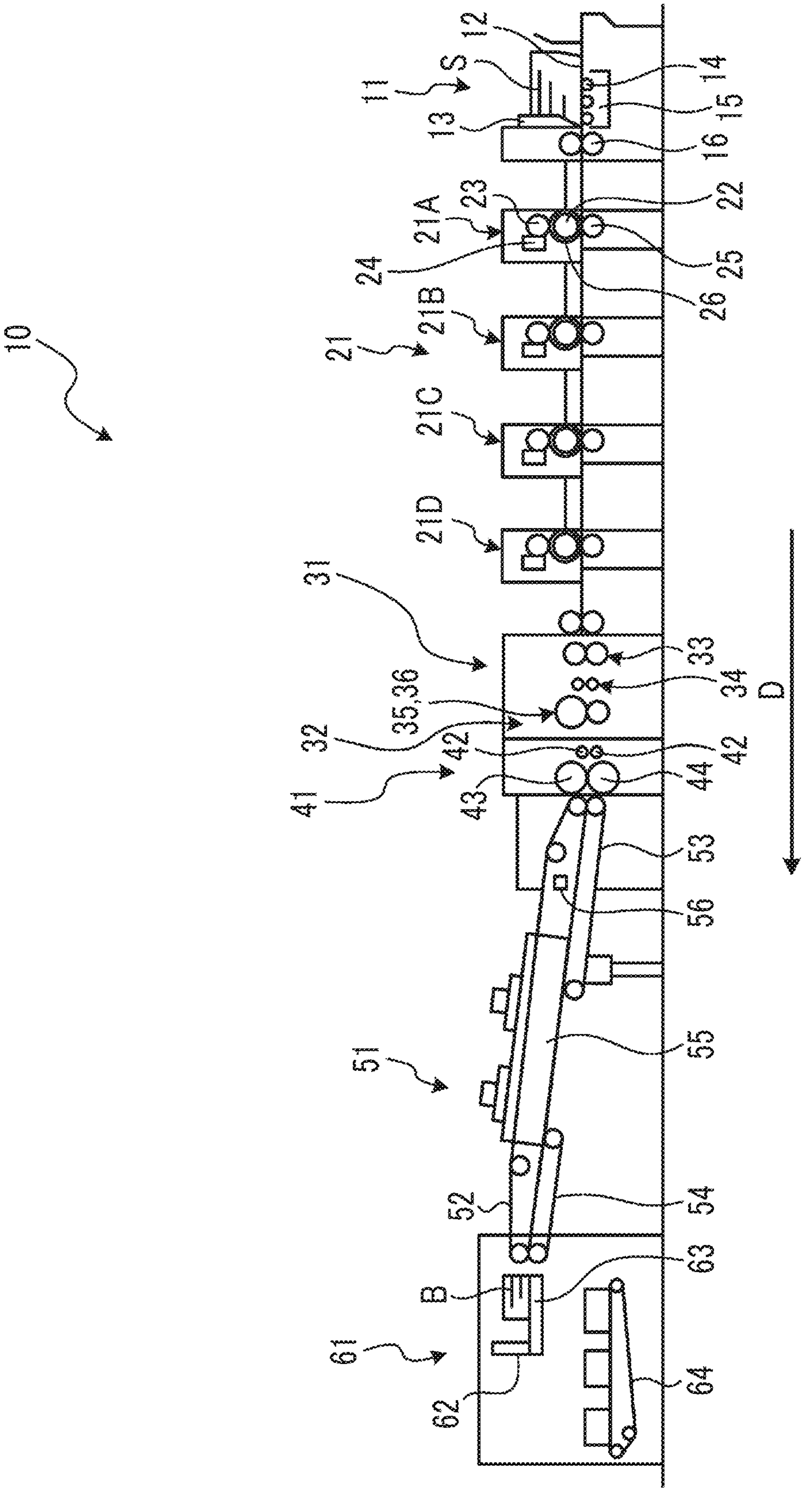
FIG. 1 is a schematic configuration view showing a box making machine of the present embodiment.

FIG. 1 is a schematic configuration view showing a box making machine of the present embodiment.

In the present embodiment, as shown in FIG. 1, a box making machine 10 manufactures a corrugated box (box body) B by processing a corrugated board S. The box making machine 10 includes a sheet feeding section 11, a printing section 21, a slotter creaser section 31, a die cutting section 41, a folding section 51, and a counter-ejector section 61. The sheet feeding section 11, the printing section 21, the slotter creaser section 31, the die cutting section 41, the folding section 51, and the counter-ejector section 61 are disposed in a straight line in a transfer direction D in which the corrugated board S and the corrugated box B are transferred.

The sheet feeding section 11 send out the corrugated boards S one by one and send them to the printing section 21 at a constant speed. The sheet feeding section 11 includes a table 12, a front pad 13, a supply roller 14, a suction device 15, and a feed roll 16. The table 12 can be placed by stacking a large number of corrugated boards S, and is supported so as to be able to move up and down. The front pad 13 can position a front end position of the corrugated boards S stacked on the table 12, and a gap through which one corrugated board S can pass is secured between a lower end portion and the table 12. A plurality of supply rollers 14 are disposed in the transfer direction D of the corrugated board S corresponding to the table 12, and when the table 12 is lowered, and send the corrugated board S at the lowest position among a large number of stacked corrugated boards S forward. The suction device 15 sucks the stacked corrugated boards S downward, that is, toward the table 12 and the supply roller 14. The feed roll 16 supplies the corrugated board S sent out by the supply roller 14 to the printing section 21.

The printing section 21 performs multicolor printing (four-color printing in the present embodiment) on the surface of the corrugated board S. In the printing section 21, four printing units 21A, 21B, 21C, and 21D are disposed in series, and printing is performed by using the four ink colors on the surface of the corrugated board S. Each of the printing units 21A, 21B, 21C, and 21D is configured in substantially the same manner, and has a printing cylinder 22, an ink supply roll (anilox roll) 23, an ink chamber 24, and a receiving roll 25. A printing plate 26 is attached to an outer peripheral portion of the printing cylinder 22, and the printing cylinder 22 is rotatably provided. The ink supply roll 23 is disposed so as to be in contact with the printing plate 26 in the vicinity of the printing cylinder 22 and is rotatably provided. The ink chamber 24 stores ink and is provided in the vicinity of the ink supply roll 23. By sandwiching the corrugated board S with the printing cylinder 22, the receiving roll 25 is transferred while applying a predetermined printing pressure, and is rotatably provided facing the lower side of the printing cylinder 22.

The slotter creaser section 31 has a function of performing a creasing line process, a function of performing a cutting process, and a function of performing groove cutting process on the corrugated board S. The slotter creaser section 31 has a first creasing line roll 33, a second creasing line roll 34, a slitter head 35, and a slotter head 36.

A plurality of first creasing line rolls 33 (4 in the present embodiment) are disposed at predetermined intervals in the horizontal direction (width direction of the corrugated board S) orthogonal to the transfer direction D of the corrugated board S, and can be rotated by a drive device (not shown). A plurality of second creasing line rolls 34 (4 in the present embodiment) are disposed at predetermined intervals in the horizontal direction orthogonal to the transfer direction D of the corrugated board S, and can be rotated by a drive device (not shown). In the first creasing line roll 33 and the second creasing line roll 34, a back surface (lower surface) of the corrugated board S is subjected to the creasing line process.

A plurality (five in total in the present embodiment) of slitter heads 35 and slotter heads 36 are disposed at predetermined intervals in the horizontal direction orthogonal to the transfer direction D of the corrugated board S, and can be rotated by a drive device (not shown). The slitter head 35 is configured of one piece and is provided corresponding to an end portion in a width direction of the corrugated board S to be transferred, and cuts the end portion in the width direction of the corrugated board S. The slotter head 36 is configured of four pieces, is provided corresponding to a predetermined position in the width direction of the corrugated board S to be transferred, performs the groove cutting process at a predetermined position in the corrugated board S, and performs the gluing margin strip process.

The die cutting section 41 performs a punching process such as a hand hole on the corrugated board S. The die cutting section 41 has a pair of upper and lower feed pieces 42, an anvil cylinder 43, and a knife cylinder 44. The feed pieces 42 sandwiches and transfers the corrugated board S from above and below, and are rotatably provided. The anvil cylinder 43 and the knife cylinder 44 are each formed in a circular shape, and can be synchronously rotated by a drive device (not shown). In this case, the anvil cylinder 43 has an anvil formed on an outer peripheral portion, while the knife cylinder 44 has a die formed at predetermined positions on an outer peripheral portion.

The folding section 51 folds the corrugated board S in the transfer direction D while being moved, and joins both end portions thereof in the width direction to form a flat corrugated box B. The folding section 51 includes an upper transfer belt 52, lower transfer belts 53 and 54, and a forming device 55. The upper transfer belt 52 and the lower transfer belts 53 and 54 sandwich and transfer the corrugated board S and the corrugated box B from above and below. The forming device 55 has a pair of left and right forming belts, and the corrugated board S is folded while bending each end portion in the width direction downward by the forming belt. Further, the folding section 51 is provided with a gluing device 56. The gluing device 56 has a glue gun and discharges glue at a predetermined timing to glue a predetermined position on the corrugated board S.

The counter-ejector section 61 stacks the corrugated boxes B while counting them, sorts them into a predetermined number of batches, and then discharges them. The counter-ejector section 61 has a hopper device 62. The hopper device 62 has an elevator 63 that can be lifted and lowered, on which corrugated boxes B are stacked, and the elevator 63 is provided with a front plate and a square plate (not shown) as shaping means. A carry-out conveyor 64 is provided below the hopper device 62.

[Corrugated Board]

Figure 2:
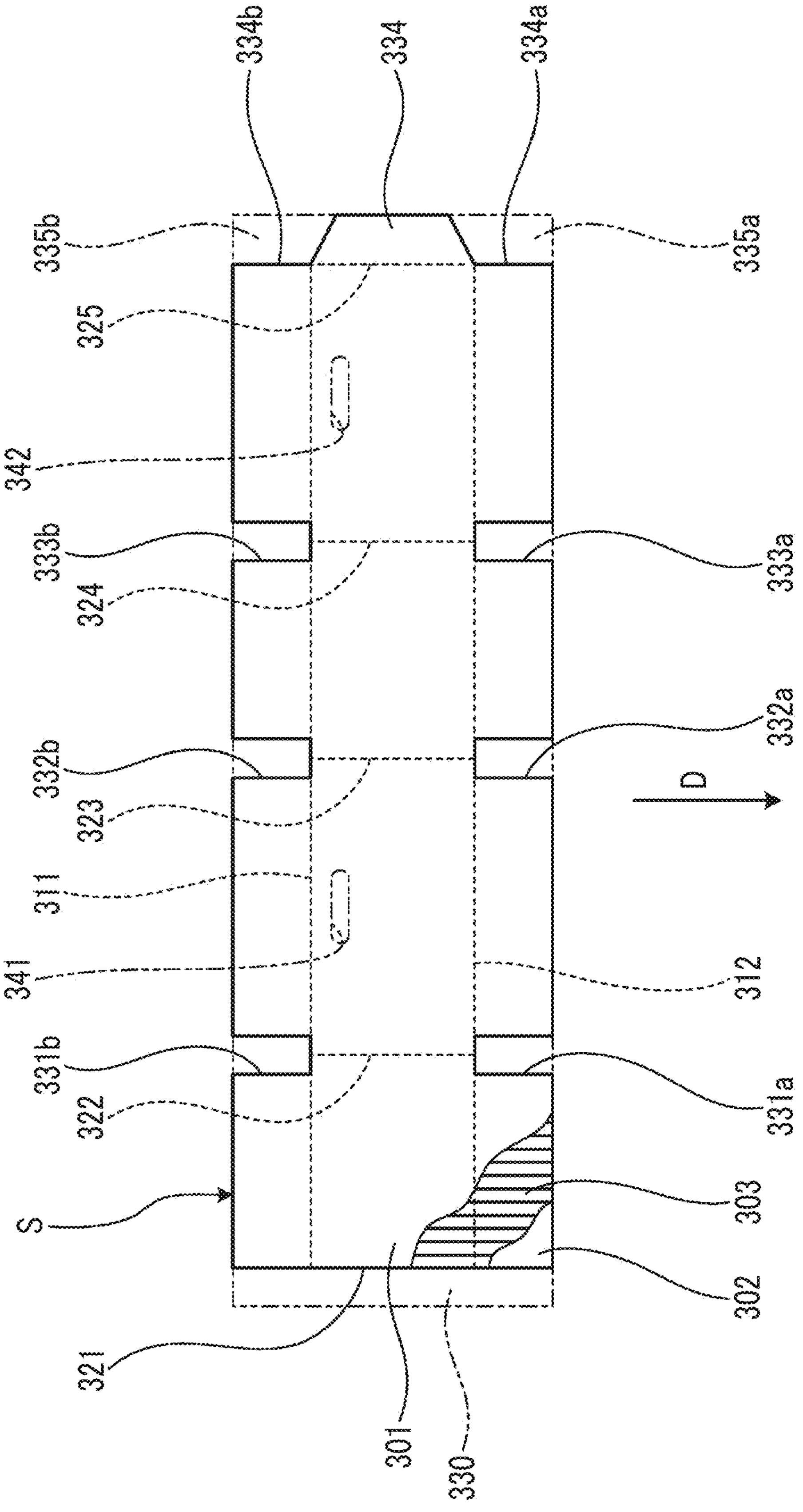
FIG. 2 is a plan view of a corrugated board processed at a slotter creaser section.

FIG. 2 is a plan view of the corrugated board processed by the slotter creaser section.

As shown in FIG. 2, the corrugated board S is formed by gluing a waved medium 303 between a bottom liner 301 and a top liner 302. In the corrugated board S, two folding lines 311 and 312 are formed in advance in the pre-process of the box making machine 10. The folding lines 311 and 312 are for folding the flaps when the corrugated box B manufactured by the box making machine 10 is assembled later.

The corrugated board S is subjected to the creasing line process and the groove cutting process in the slotter creaser section 31. In the corrugated board S, cutting lines 321 and creasing lines 322, 323, 324, and 325 are formed at predetermined intervals in the width direction. Further, in the corrugated board S, grooves 331*a*, 331*b*, 332*a*, 332*b*, 333*a*, and 333*b*, and notches 334*a* and 334*b* are formed at predetermined intervals in the width direction.

[Action of Box Making Machine]

As shown in FIG. 1, a large number of corrugated boards S are stacked on the table 12 of the sheet feeding section 11. In the sheet feeding section 11, the corrugated board S is positioned by the front pad 13, and the table 12 is lowered to send out the corrugated board S at the lowest position by a plurality of supply rollers 14. Then, the corrugated board S is supplied to the printing section 21 at a predetermined constant speed by a pair of feed rolls 16.

In the printing section 21, each of the printing units 21A, 21B, 21C, and 21D is supplied with ink from the ink chamber 24 on the surface of the ink supply roll 23, and when the printing cylinder 22 and the ink supply roll 23 rotate, the ink on the surface of the ink supply roll 23 is transited to the printing plate 26. When the corrugated board S is transferred between the printing cylinder 22 and the receiving roll 25, the corrugated board S is sandwiched between the printing plate 26 and the receiving roll 25, and printing pressure is applied to the corrugated board S to print on the surface. The printed corrugated board S is transferred to the slotter creaser section 31 by the feed roll.

As shown in FIGS. 1 and 2, when the corrugated board S passes through the first creasing line roll 33 in the slotter creaser section 31, the creasing lines 322, 323, 324, and 325 are formed on the back surface side of the corrugated board S, that is, on the top liner 302. When the corrugated board S passes through the second creasing line roll 34, similarly to the first creasing line roll 33, the creasing lines 322, 323, 324, and 325 are reformed on the back surface side of the corrugated board S, that is, on the top liner 302.

Next, when the corrugated board S on which the creasing lines 322, 323, 324, and 325 are formed passes through the slitter head 35, one end portion 330 is cut by the cutting line 321. Further, when the corrugated board S passes through each slotter head 36, the grooves 331*a*, 332*a*, and 333*a*, and the notch 334*a* are formed at positions on a downstream side of the creasing lines 322, 323, and 324, and the grooves 331*b*, 332*b*, and 333*b*, and the notch 334*b* are formed at positions on an upstream side of the creasing line 322, 323, and 324. The other end portions 335*a* and 335*b* are cut by the notches 334*a* and 334*b* to form the gluing margin strip (joint piece) 334. After that, the corrugated board S that has been subjected to the creasing line process and the groove cutting process is transferred to the die cutting section 41.

In the die cutting section 41, when the corrugated board S passes between the anvil cylinder 43 and the knife cylinder 44, hand holes 341 and 342 are formed. The corrugated board S in which the hand holes 341 and 342 are formed is transferred to the folding section 51.

In the folding section 51, the corrugated board S is moved in the transfer direction D by the upper transfer belt 52 and the lower transfer belts 53 and 54. The gluing device 56 applies glue to the gluing margin strip 334, and the forming device 55 folds the corrugated board S downward with the creasing lines 322 and 324 as the base points. When the folding progresses to nearly 180 degrees, the folding force becomes stronger, and the end portions of the corrugated board S overlapping the gluing margin strip 334 and the gluing margin strip 334 are pressed and brought into close contact with each other, and both end portions of the corrugated board S are joined to become the corrugated box B. The corrugated box B is transferred to the counter-ejector section 61.

In the counter-ejector section 61, the corrugated box B is sent to the hopper device 62. The corrugated box B sent to the hopper device 62 is stacked on the elevator 63 in a state where the tip portion in the transfer direction D hits the front plate and is shaped by the square plate. When a predetermined number of corrugated boxes B are stacked on the elevator 63, the elevator 63 is lowered, and the predetermined number of corrugated boxes B are discharged as one batch by the carry-out conveyor 64 and sent to the subsequent process of the box making machine 10.

[Slotter Creaser Section]

Figure 3:
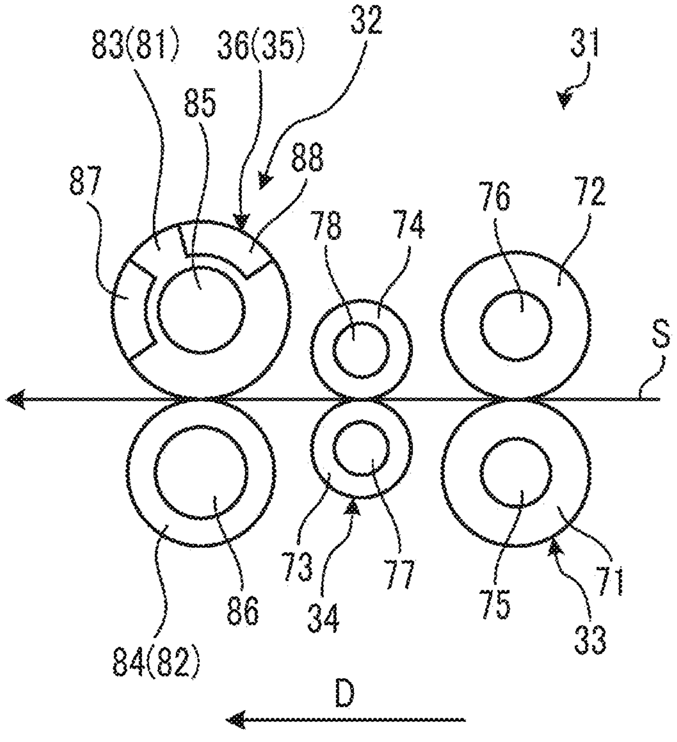
FIG. 3 is a schematic side view showing the slotter creaser section.

Here, the slotter creaser section 31 having the slitter device of the present embodiment will be described in detail. FIG. 3 is a schematic side view showing the slotter creaser section, and FIG. 4 is a schematic front view showing the slotter creaser section.

Figure 4:
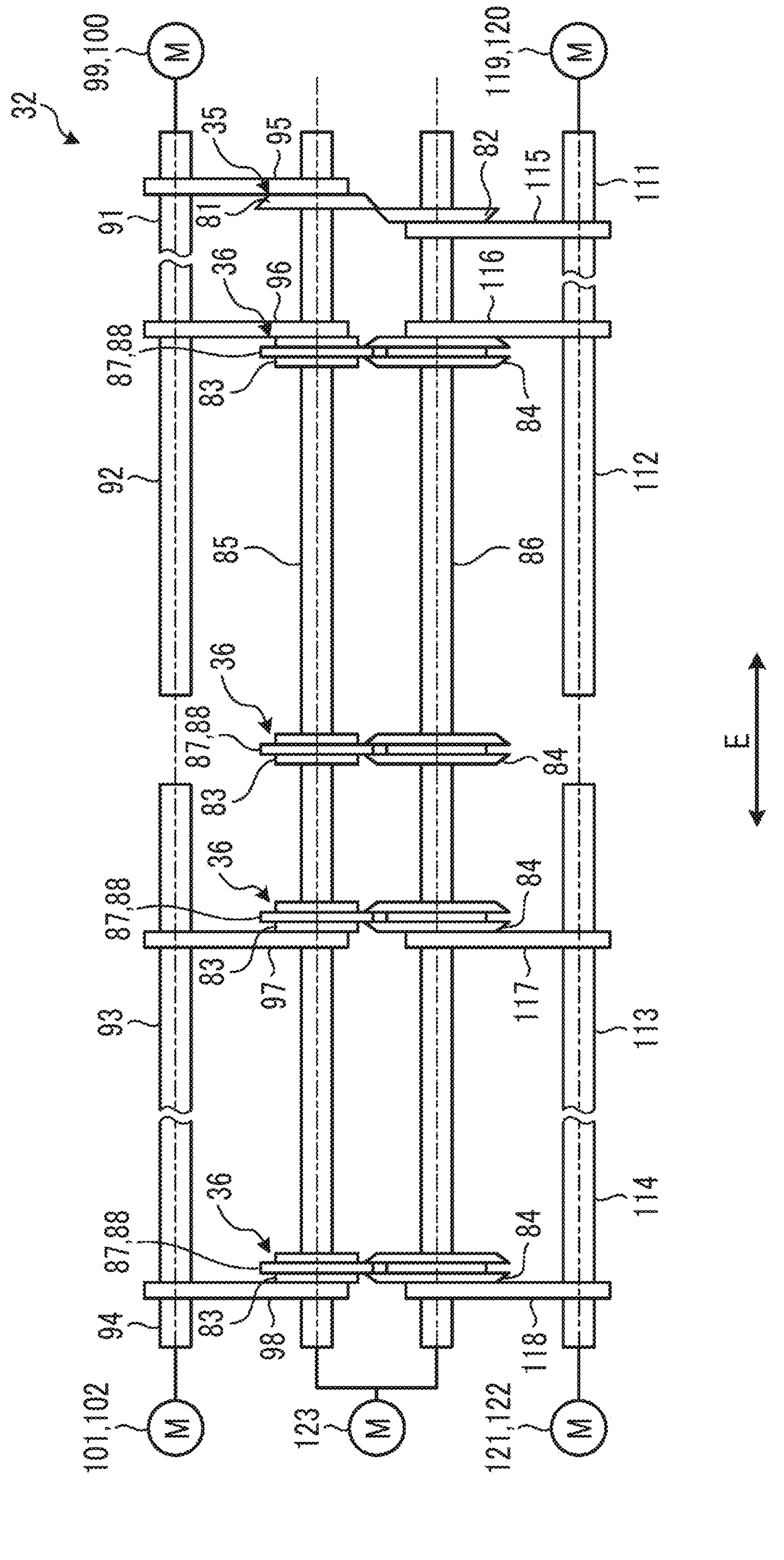
FIG. 4 is a schematic front view showing the slotter creaser section.

As shown in FIGS. 3 and 4, the slotter creaser section 31 has the slitter device 32, and the corrugated board S is subjected to the cutting process to cut the end portion in the width direction. The slotter creaser section 31 has a first creasing line roll 33, a second creasing line roll 34, a slitter head 35, and a slotter head 36.

The first creasing line roll 33 has a creasing line roll main body 71 and a receiving roll 72. The creasing line roll main body 71 is located below, and the receiving roll 72 is located above. The creasing line roll main body 71 and the receiving roll 72 have a disk shape, and a plurality of sets are disposed in the horizontal direction (hereinafter, referred to as the width direction) E orthogonal to the transfer direction D of the corrugated board S. The second creasing line roll 34 has a creasing line roll main body 73 and a receiving roll 74. The creasing line roll main body 73 is located below, and the receiving roll 74 is located above. The creasing line roll main body 73 and the receiving roll 74 have a disk shape, and a plurality of sets are disposed in the width direction E of the corrugated board S. An outer diameter of the first creasing line roll 33 is larger than an outer diameter of the second creasing line roll 34.

The lower roll shaft 75 and the upper roll shaft 76 are vertically spaced parallel to each other at predetermined intervals, and are disposed along the width direction E of the corrugated board S, and each end portion in the axial direction is rotatably supported by a frame (not shown). A plurality of creasing line roll main bodies 71 are fixed to the lower roll shaft 75 at predetermined intervals in the axial direction. A plurality of receiving rolls 72 are fixed to the upper roll shaft 76 at predetermined intervals in the axial direction. The lower roll shaft 77 and the upper roll shaft 78 are disposed on the downstream side of the corrugated board S in the transfer direction D from the lower roll shaft 75 and the upper roll shaft 76. The lower roll shaft 77 and the upper roll shaft 78 are vertically spaced parallel to each other at predetermined intervals, and are disposed along the width direction E of the corrugated board S, and each end portion in the axial direction is rotatably supported by a frame (not shown). A plurality of creasing line roll main bodies 73 are fixed to the lower roll shaft 77 at predetermined intervals in the axial direction. A plurality of receiving rolls 74 are fixed to the upper roll shaft 78 at predetermined intervals in the axial direction.

The creasing line roll main body 71 and the receiving roll 72, and the creasing line roll main body 73 and the receiving roll 74 are disposed so as to face each other vertically. The first creasing line roll 33 and the second creasing line roll 34 are disposed at the same positions in the axial direction of the roll shafts 75, 76, 77, and 78.

Therefore, when the corrugated board S is transferred between the creasing line roll main body 71 and the receiving roll 72 of the first creasing line roll 33, the outer peripheral portion of the creasing line roll main body 71 and the outer peripheral portion of the receiving roll 72 sandwich the corrugated board S, and when the corrugated board S passes between the two, a creasing line is formed on the lower surface. Further, when the corrugated board S is transferred between the creasing line roll main body 73 and the receiving roll 74 of the second creasing line roll 34, the outer peripheral portion of the creasing line roll main body 73 and the outer peripheral portion of the receiving roll 74 sandwich the corrugated board S, and when the corrugated board S passes between the two, a creasing line is reformed on the lower surface. In the corrugated board S, one creasing line is formed by forming the creasing line by the first creasing line roll 33 and the second creasing line roll 34 at the same position.

The slitter head 35 has a slitter upper knife 81 and a slitter lower knife 82. The slitter upper knife 81 is located above, and the slitter lower knife 82 is located below. The slitter upper knife 81 and the slitter lower knife 82 have a disk shape, and one set is disposed at the end portion of the corrugated board S in the horizontal direction orthogonal to the transfer direction D. The slitter head 35 is provided corresponding to the end portion in the width direction E of the corrugated board S to be transferred by the slitter upper knife 81 and the slitter lower knife 82, and cuts the end portion of the corrugated board S in the width direction E.

The slotter head 36 has an upper slotter head 83 and a lower slotter head 84. The upper slotter head 83 is located above and the lower slotter head 84 is located below. The upper slotter head 83 and the lower slotter head 84 have a disk shape, and four sets are disposed at predetermined intervals in the width direction E of the corrugated board S. The slotter head 36 is provided by the upper slotter head 83 and the lower slotter head 84 corresponding to a predetermined position in the width direction E of the corrugated board S to be transferred, and performs the groove cutting process at a predetermined position on the corrugated board S, and performs the gluing margin strip process.

The upper slotter shaft 85 and the lower slotter shaft 86 are vertically spaced parallel to each other at predetermined intervals, and are disposed along the width direction E of the corrugated board S, and each end portion in the axial direction is rotatably supported by a frame (not shown). The upper slotter shaft 85 is fixed to the slitter upper knife 81 and four upper slotter heads 83 at predetermined intervals in the axial direction. The lower slotter shaft 86 is fixed to the slitter lower knife 82 and the four lower slotter heads 84 at predetermined intervals in the axial direction. The slitter upper knife 81 and the slitter lower knife 82, and the upper slotter head 83 and the lower slotter head 84 are disposed so as to face each other vertically. The slitter head 35 and the slotter head 36 are disposed at the same positions as the first creasing line roll 33 and the second creasing line roll 34 in the width direction E of the corrugated board S.

The slotter head 36 is provided with two slotter knives 87 and 88 respectively mounted on the outer peripheral portion of the upper slotter head 83. The slitter head 35 is disposed at one end portion in the width direction E of the corrugated board S. Three of the four slotter heads 36 have slotter knives 87 and 88 used for groove cutting process of the corrugated board S and are disposed in an intermediate portion in the width direction E of the corrugated board S. Further, in one of the four slotter heads 36, the slotter knives 87 and 88 includes a glue margin knife (not shown) for the gluing margin strip process of the corrugated board S, and is disposed at the other end portion in the width direction E of the corrugated board S.

Therefore, when the corrugated board S is transferred between the slitter upper knife 81 and the slitter lower knife 82 of the slitter head 35, the outer peripheral portion of the slitter upper knife 81 and the outer peripheral portion of the slitter lower knife 82 sandwich the corrugated board S, and when the corrugated board S passes between the two, the end portion of the corrugated board S is cut by the slitter upper knife 81 and the slitter lower knife 82. Further, when the corrugated board S is transferred between the upper slotter head 83 and the lower slotter head 84 of the slotter head 36, the outer peripheral portion of the upper slotter head 83 and the outer peripheral portion of the lower slotter head 84 sandwich the corrugated board S, and when the corrugated board S passes between the two, the corrugated board S is subjected to the groove cutting process by the slotter knives 87 and 88, and the gluing margin strip process.

By the way, the box making machine 10 can process the corrugated boards S having a plurality of different sizes to manufacture the corrugated box B. In the corrugated boards S having different sizes, the positions of the cutting line 321, the grooves 331*a*, 331*b*, 332*a*, 332*b*, 333*a*, and 333*b*, and the notches 334*a* and 334*b* are different in the width direction E of the corrugated board S. Therefore, when the size of the corrugated board S to be processed is changed, it is necessary to adjust the positions of the width direction E in the first creasing line roll 33, the second creasing line roll 34, the slitter head 35, and the slotter head 36.

The upper movement shafts 91, 92, 93, and 94 are parallel to each other above the upper slotter shaft 85 at predetermined intervals, are disposed in the width direction E of the corrugated board S, and each end portion in the axial direction is rotatably supported by a frame which is not shown. The upper movement shafts 91 and 92 are disposed on one side in the width direction E (right side in FIG. 4) so as to be offset in the transfer direction D, and the upper movement shafts 93 and 94 are disposed on the other side in the width direction E (left side in FIG. 4) so as to be offset in the transfer direction D. The upper movement shafts 91, 92, 93, and 94 are screw shafts, and the upper end portions of the upper movement frames 95, 96, 97, and 98 are screwed thereto, respectively. In the upper movement frames 95, 96, 97, and 98, the slitter upper knife 81 of the slitter head 35 and the upper slotter head 83 of the three slotter heads 36 are rotatably supported at the lower end portion thereof, respectively.

The upper slotter shaft 85 is fitted to the center portion of the slitter upper knife 81 and the three upper slotter heads 83 via a key (not shown). The slitter upper knife 81 and the three upper slotter heads 83 can be integrally rotated with respect to the upper slotter shaft 85, and are supported so as to be movable in the axial direction. The upper movement shafts 91, 92, 93, and 94 can be driven and rotated by the upper drive devices 99, 100, 101, and 102, respectively.

The lower movement shafts 111, 112, 113, and 114 are parallel to each other below the lower slotter shaft 86 at predetermined intervals, and are disposed in the width direction E of the corrugated board S, and each end portion in the axial direction is rotatably supported by the frame which is not shown. The lower movement shafts 111 and 112 are disposed on one side in the width direction E (right side in FIG. 4) so as to be offset in the transfer direction D, and the lower movement shafts 113 and 114 are disposed on the other side in the width direction E (left side in FIG. 4) so as to be offset in the transfer direction D. The lower movement shafts 111, 112, 113, and 114 are screw shafts, and the lower end portions of the lower movement frames 115, 116, 117, and 118 are screwed thereto, respectively. In the lower movement frames 115, 116, 117, and 118, the slitter lower knife 82 of the slitter head 35 and the lower slotter head 84 of the three slotter heads 36 are rotatably supported at the upper end portion thereof, respectively.

The lower slotter shaft 86 is fitted to the center portion of the slitter lower knife 82 and the three lower slotter heads 84 via a key (not shown). The slitter lower knife 82 and the three lower slotter heads 84 are integrally rotatable with respect to the lower slotter shaft 86, and are supported so as to be movable in the axial direction. The lower movement shafts 111, 112, 113, and 114 can be driven and rotated by the lower drive devices 119, 120, 121, and 122, respectively. The upper slotter shaft 85 and the lower slotter shaft 86 can be driven and rotated by a common drive device (motor) 123.

Therefore, when the upper movement shaft 91 and the lower movement shaft 111 are driven and rotated by the drive devices 99 and 119, the upper movement frame 95 and the lower movement frame 115 are screwed to the upper movement shaft 91 and the lower movement shaft 111 move in the axial direction. Then, the slitter upper knife 81 and the slitter lower knife 82 supported by the upper movement frame 95 and the lower movement frame 115 move in the axial direction of the upper slotter shaft 85 and the lower slotter shaft 86. In this case, the slitter upper knife 81 and the slitter lower knife 82 can be individually and independently moved by the drive devices 99 and 119.

Further, when the upper movement shaft 92 and the lower movement shaft 112 are driven and rotated by the drive devices 100 and 120, the upper movement frame 96 and the lower movement frame 116 are screwed to the upper movement shaft 92 and the lower movement shaft 112 move in the axial direction. Then, the upper slotter head 83 and the lower slotter head 84 supported by the upper movement frame 96 and the lower movement frame 116 move in the axial direction of the upper slotter shaft 85 and the lower slotter shaft 86. In this case, since the upper slotter head 83 is fitted to the lower slotter head 84, it is necessary to synchronously move the upper slotter head 83 and the lower slotter head 84 by the drive devices 100 and 120.

Similarly, when the upper movement shaft 93 and the lower movement shaft 113 are driven and rotated by the drive devices 101 and 121, the upper slotter head 83 and the lower slotter head 84 can be moved via the upper movement frame 97 and the lower movement frame 117. Further, when the upper movement shaft 94 and the lower movement shaft 114 are driven and rotated by the drive devices 102 and 122, the upper slotter head 83 and the lower slotter head 84 can be moved via the upper movement frame 98 and the lower movement frame 118. The upper slotter head 83 and the lower slotter head 84 disposed in the intermediate portion in the width direction E are supported by a frame (not shown) so as not to move in the axial direction of the upper slotter shaft 85 and the lower slotter shaft 86.

Further, when the upper slotter shaft 85 and the lower slotter shaft 86 are driven and rotated by the drive device 123, the slitter upper knife 81 and the three upper slotter heads 83, and the slitter lower knife 82 and the three lower slotter heads 84 can be driven and rotated.

[Configuration of Slitter Device]

Figure 5:
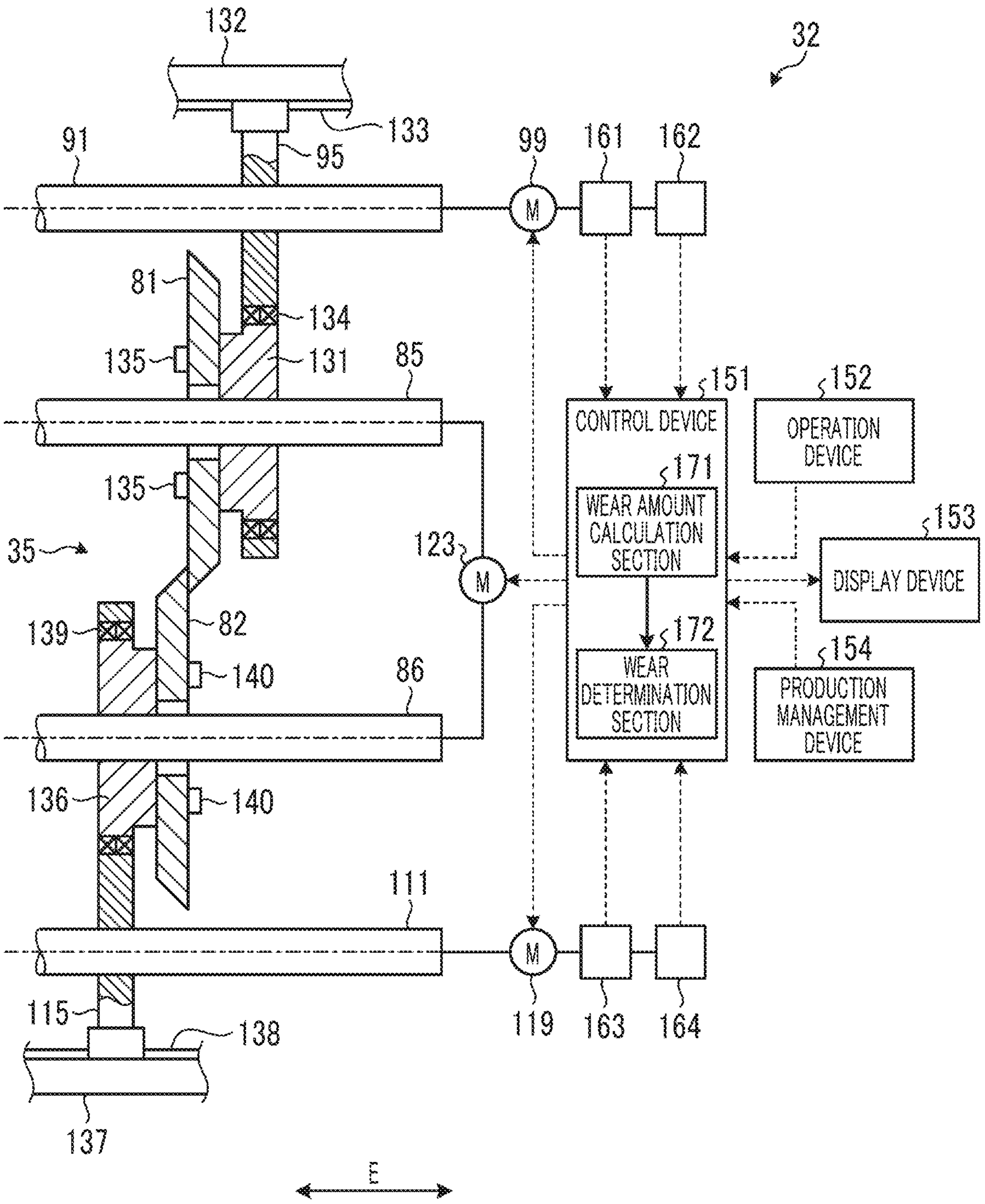
FIG. 5 is a schematic view showing a slitter device of the present embodiment.

FIG. 5 is a schematic view showing the slitter device of the present embodiment.

As shown in FIG. 5, the slitter device 32 includes an upper slotter shaft (upper rotary shaft) 85, a lower slotter shaft (lower rotary shaft) 86, a slitter upper knife (upper slitter head) 81, a slitter lower knife (lower slitter head) 82, an upper movement shaft 91 and an upper drive device 99 as an upper movement device, a lower movement shaft 111 and a lower drive device 119 as a lower movement device, and a control device 151.

An end portion of the upper slotter shaft 85 in the axial direction is rotatably supported by the frame by the bearing. In the upper slotter shaft 85, the cutter rest 131 is integrally rotatable and is supported so as to be movable in the axial direction. The cutter rest 131 has a disk shape. The guide rail

133 is fixed to the upper frame 132 in the width direction E of the corrugated board S (the axial direction of the upper slotter shaft 85). In the upper movement frame 95, the upper end portion is movably supported by the guide rail 133. The upper movement frame 95 has an annular shape at the lower end portion, and the cutter rest 131 is rotatably supported by the bearing 134 at the inner peripheral portion. In the cutter rest 131, a slitter upper knife 81 having a disk shape is fixed to the end surface by a plurality of bolts 135.

An end portion of the lower slotter shaft 86 in the axial direction is rotatably supported by the frame by the bearing. In the lower slotter shaft 86, the cutter rest 136 is integrally rotatable and is supported so as to be movable in the axial direction. The cutter rest 136 has a disk shape. The guide rail 138 is fixed to the lower frame 137 in the width direction E of the corrugated board S (axial direction of the lower slotter shaft 86). The lower end portion of the lower movement frame 115 is movably supported by the guide rail 138. The lower movement frame 115 has an annular shape at the upper end portion, and the cutter rest 136 is rotatably supported by the bearing 139 at the inner peripheral portion. A disk-shaped slitter lower knife 82 is fixed to the end surface of the cutter rest 136 by a plurality of bolts 140.

The upper drive device 99 can rotate the upper movement shaft 91, and the lower drive device 119 can rotate the lower movement shaft 111. The upper drive device 99 rotates the upper movement shaft 91 and can move the slitter upper knife 81 in the axial direction via the upper movement frame 95. The lower drive device 119 rotates the lower movement shaft 111, and can move the slitter lower knife 82 in the axial direction via the lower movement frame 115. Further, the drive device 123 can rotate the upper slotter shaft 85 and the lower slotter shaft 86. In the drive device 123, the driving force is transmitted to the upper slotter shaft 85 and the lower slotter shaft 86, and the slitter upper knife 81 and the slitter lower knife 82 can be synchronously rotated via the cutter rests 131 and 136.

The upper drive device 99 is connected to the rotation position detector 161 and the torque detector 162. The lower drive device 119 is connected to the rotation position detector 163 and the torque detector 164. The rotation position detectors 161 and 163 detect the rotation angle (rotation position) of each of the motors constituting the upper drive device 99 and the lower drive device 119. The torque detectors 162 and 164 detect the torque (load) output by each of the motors. The motors respectively constituting the upper drive device 99 and the lower drive device 119 are servomotors. The servomotor has a servo lock function. The servo lock function of the motor is a holding function when the motor is stopped. When there is no command pulse in the position control, if even one pulse shifts due to an external force, a position loop operates to correct an error, causing a current to flow through the motor and generating the torque that resists the external force, and thereby the stop position can be held.

The control device 151 can drive and control the upper drive device 99, the lower drive device 119, and the drive device 123. The control device 151 inputs detection results of the rotation position detectors 161 and 163, and the torque detectors 162 and 164. Further, the control device 151 is connected to the operation device 152, the display device 153, and the production management device 154.

The operation device 152 inputs various operation command signals to the control device 151 by being operated by an operator. By inputting various information from the control device 151, the display device 153 displays the current work content, progress status, and the like, and also displays various alarms. The production management device 154 has manufacturing information of the corrugated board S on which the box making machine 10 works, and the control device 151 inputs the manufacturing information of the corrugated board S from the production management device 154. The manufacturing information of the corrugated board S includes the size of the corrugated board S to be manufactured, the position of the cutting line 321, the positions of the grooves 331*a*, 331*b*, 332*a*, 332*b*, 333*a*, and 333*b*, and the positions of the notches 334*a* and 334*b*. The size of the corrugated board S to be manufactured, the position of the cutting line 321, the positions of the grooves 331*a*, 331*b*, 332*a*, 332*b*, 333*a*, and 333*b*, and the positions of the notches 334*a* and 334*b* are the position information of the slitter head 35 and the slotter head 36 in the width direction E. The control device 151 drives and controls the upper drive devices 99, 100, 101, and 102, and the lower drive devices 119, 120, 121, and 122 based on the position information of the slitter head 35 and the slotter head 36 in the width direction E input from the production management device 154.

[Control of Slitter Upper Knife and Slitter Lower Knife]

When the size of the corrugated board S to be manufactured is changed, it is necessary to adjust the positions of the slitter head 35 and the slotter head 36. During the corrugated board S is processed, the slitter head 35 maintains the outer peripheral end surface of the slitter upper knife 81 and the outer peripheral end surface of the slitter lower knife 82 in a pressed state with each other. Therefore, the processing position is adjusted by moving the slitter upper knife 81 and the slitter lower knife 82 independently. On the other hand, since the upper slotter head 83 is fitted to the lower slotter head 84, the slotter head 36 adjusts the processing position by synchronously moving the upper slotter head 83 and the lower slotter head 84. In the following description, the position adjusting work of the slitter head 35 will be described.

In the present embodiment, when adjusting the processing position of the slitter head 35, the control device 151 moves and positions one of the slitter upper knife 81 and the slitter lower knife 82 by any one of the upper drive device 99 and the lower drive device 119 to a preset cutting position, and then moves and positions the other of the slitter upper knife 81 and the slitter lower knife 82 by the other of the upper drive device 99 and the lower drive device 119 to a pressing position where the other thereof is pressed against the one thereof.

When moving one of the slitter upper knife 81 and the slitter lower knife 82 to the cutting position by any one of the upper drive device 99 and the lower drive device 119, the control device 151 moves the other of the slitter upper knife 81 and the slitter lower knife 82 by the other of the upper drive device 99 and the lower drive device 119 with a predetermined gap with respect to the one thereof.

When moving the slitter upper knife 81 and the slitter lower knife 82 with a predetermined gap, the control device 151 positions, for example, one of the slitter upper knife 81 and the slitter lower knife 82 located on the upstream side in the moving direction at the cutting position, and then positions the other of the slitter upper knife 81 and the slitter lower knife 82 located on the downstream side in the moving direction at the pressing position. Further, one of the slitter upper knife 81 and the slitter lower knife 82 located on the downstream side in the moving direction may be positioned at the cutting position, and then the other of the slitter upper knife 81 and the slitter lower knife 82 located on the upstream side in the moving direction may be returned to be positioned at the pressing position.

The control device 151 moves the other of the slitter upper knife 81 and the slitter lower knife 82 to the pressing position by the other of the upper drive device 99 and the lower drive device 119, and then continues to apply the pressing force by the other of the upper drive device 99 and the lower drive device 119.

In this case, when the other of the slitter upper knife 81 and the slitter lower knife 82 is moved to the pressing position by the other of the upper drive device 99 and the lower drive device 119, the control device 151 may fix the other of the slitter upper knife 81 and the slitter lower knife 82 at the pressing position. Further, when the other of the slitter upper knife 81 and the slitter lower knife 82 is moved to the pressing position by the other of the upper drive device 99 and the lower drive device 119, the control device 151 may move by a predetermined distance which is set in advance, and fix the other of after contacting one of the slitter upper knife 81 and the slitter lower knife 82 with the cutting position.

The control device 151 operates the lock function of the servomotor constituting the upper drive device 99 or the lower drive device 119 when the slitter upper knife 81 or the slitter lower knife 82 is moved and positioned to the cutting position.

The control device 151 moves and positions one of the slitter upper knife 81 and the slitter lower knife 82 on the upstream side in the moving direction to the cutting position when a slitter preparation signal is input, and moves and positions the other of the slitter upper knife 81 and the slitter lower knife 82 on the downstream side in the moving direction to the pressing position, and then starts the cutting work of the corrugated board S when a slitter cutting start signal is input.

Further, when a fine adjustment signal is input during the cutting work of the corrugated board S by the slitter upper knife 81 and the slitter lower knife 82, the control device 151 moves the slitter upper knife 81 and the slitter lower knife 82 to position them at fine adjustment positions while maintaining the pressed state between the slitter upper knife 81 and the slitter lower knife 82.

Then, when a stop signal is input during the cutting work of the corrugated board S by the slitter upper knife 81 and the slitter lower knife 82, the control device 151 moves one of the slitter upper knife 81 and the slitter lower knife 82 located at the pressing position to a retracted position separated by a predetermined distance (predetermined gap) set in advance from the other thereof.

Further, the control device 151 has a wear amount calculation section 171 that calculates a wear amount of the slitter upper knife 81 or the slitter lower knife 82 based on detection results of the rotation position detectors 161 and 163, and a wear determination section 172 that determines wear by comparing the wear amount calculated by the wear amount calculation section 171 with a preset wear limit amount.

In this case, the wear amount calculation section 171 calculates the wear amount of the slitter upper knife 81 or the slitter lower knife 82 based on the movement amount of the slitter upper knife 81 or the slitter lower knife 82 from the initial pressing position. Alternatively, the wear amount calculation section 171 calculates the wear amount of the slitter upper knife 81 or the slitter lower knife 82 based on the distance between the position of the slitter upper knife 81 and the position of the slitter lower knife 82.

[Action of Slitter Device]

Figure 6:
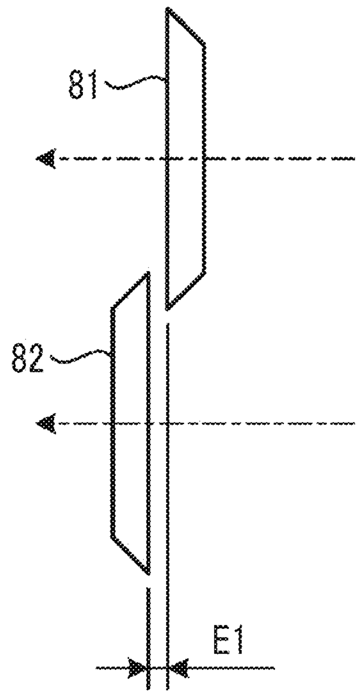
FIG. 6 is a schematic view showing a moving state of the slitter head at the time of positioning.
Figure 7:
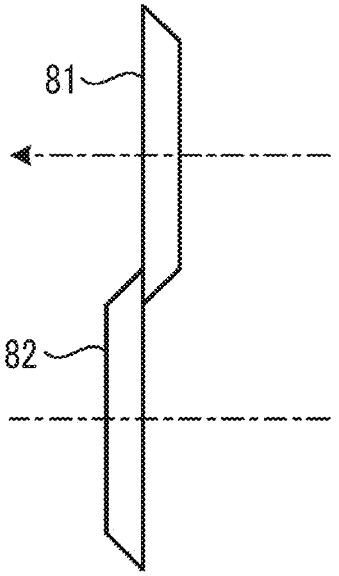
FIG. 7 is a schematic view showing an operating state of the slitter head.
Figure 8:
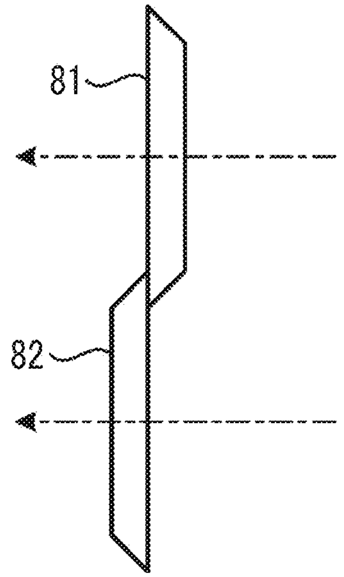
FIG. 8 is a schematic view showing a moving state of the slitter head when the slitter head is operated.
Figure 9:
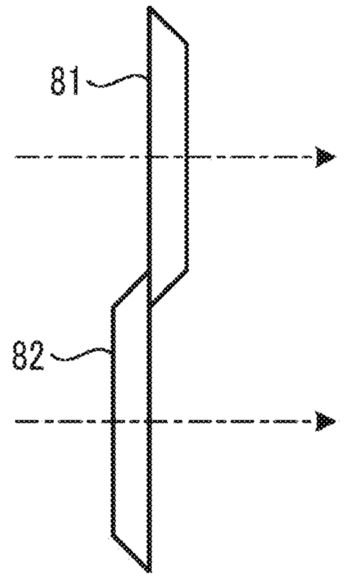
FIG. 9 is a schematic view showing a moving state of the slitter head when the slitter head is operated.
Figure 10:
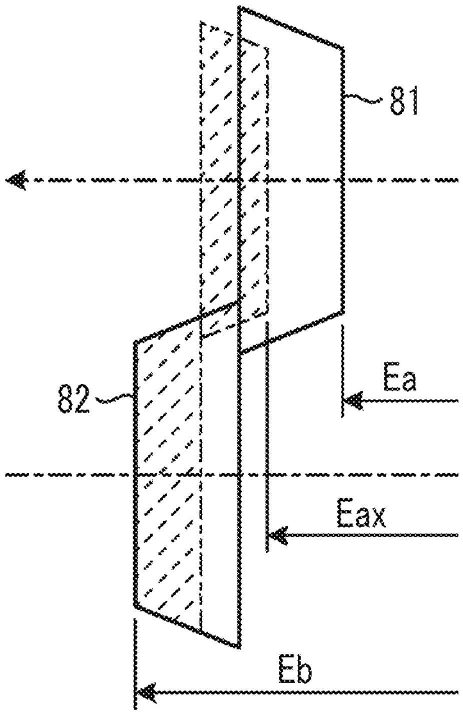
FIG. 10 is a schematic view showing a wear state of the slitter head.
Figure 11:
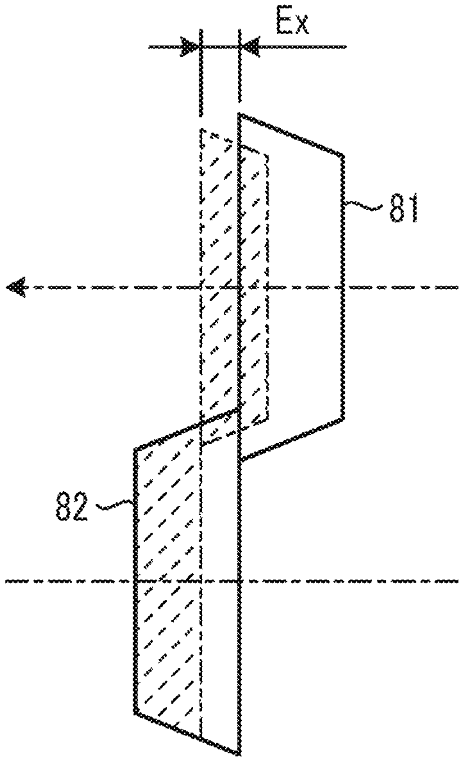
FIG. 11 is a schematic view showing a wear state of the slitter head.

FIG. 6 is a schematic view showing a moving state when the slitter head is positioned, FIG. 7 is a schematic view showing an operating state of the slitter head, FIG. 8 is a schematic view showing a moving state when the slitter head is operating, and FIG. 9 is a schematic view showing a moving state when the slitter head is operated. FIGS. 10 and 11 are schematic views showing a wear state of the slitter head. In addition, in FIGS. 10 and 11, a thickness is intentionally shown to be thick in order to explain the wear state of the slitter upper knife and the slitter lower knife.

As shown in FIGS. 5 and 6, when adjusting the processing position of the slitter head 35, when a slitter preparation signal is input from the operation device 152, the control device 151 drives and controls the upper drive device 99 and the lower drive device 119, and moves the slitter lower knife 82 to the cutting position (left in FIG. 6) while maintaining a predetermined gap E1 (for example, 0.2 mm to 1.0 mm) between the slitter upper knife 81 and the slitter lower knife 82. That is, the control device 151 drives and controls the lower drive device 119 so that the current position of the slitter lower knife 82 input from the rotation position detector 163 reaches the cutting position of the slitter lower knife 82 input from the production management device 154. At this time, the control device 151 drives and controls the upper drive device 99 so that the current position of the slitter upper knife 81 input from the rotation position detector 161 coincides with the position where the slitter lower knife 82 is separated from the cutting position by the predetermined gap E1. When the slitter lower knife 82 reaches the cutting position, the control device 151 stops and positions the movement of the slitter lower knife 82 by the lower drive device 119. At this time, the control device 151 stops the slitter upper knife 81 at the position separated from the slitter lower knife 82 by the predetermined gap E1 by the upper drive device 99.

In this state, when the slitter cutting start signal is input from the operation device 152, as shown in FIGS. 5 and 7, the control device 151 moves and positions the slitter upper knife 81 to the pressing position (left in FIG. 7) where the slitter upper knife 81 presses the slitter lower knife 82 by the upper drive device 99. That is, the control device 151 drives and controls the upper drive device 99 based on the pressing torque (load torque) of the slitter upper knife 81 input from the torque detector 162. Here, the control device 151 drives and controls the upper drive device 99 so that the pressing torque (load torque) of the slitter upper knife 81 input from the torque detector 162 is maintained at a predetermined pressing torque which is set in advance. In this state, the slitter upper knife 81 and the slitter lower knife 82 are rotated to start the cutting work of the corrugated board S. The predetermined pressing torque may be obtained and set in advance by an experiment or the like.

In this case, it is preferable that the control device 151 moves the slitter upper knife 81 to the pressing position for pressing the slitter lower knife 82 by the upper drive device 99, and then continues to apply the pressing force by the upper drive device 99. However, the method is not limited to this method. For example, when the upper drive device 99 moves the slitter upper knife 81 to the pressing position, the control device 151 may operate the servo lock of the upper drive device 99 to fix the slitter upper knife 81 to the pressing position. Further, when the upper drive device 99 moves the slitter upper knife 81 to the pressing position, the control device 151 causes the slitter upper knife 81 to come into contact with the slitter lower knife 82 at the cutting position, and then moves the slitter upper knife 81 by a predetermined distance which is set in advance. Then, the servo lock of the motor may be operated to fix the slitter upper knife 81 at the pressing position. Here, the contact position between the slitter upper knife 81 and the slitter lower knife 82 is a position where the pressing force of the slitter upper knife 81 by the upper drive device 99 reaches a preset contact pressure (value larger than 0). The predetermined distance is a distance (for example, 0.05 mm) that the slitter upper knife 81 reaches the predetermined pressing torque after coming into contact with the slitter lower knife 82, and is determined in advance by an experiment or the like.

In the above description, since the cutting position is on the left side of FIG. 6 with respect to the current positions of the slitter upper knife 81 and the slitter lower knife 82, the slitter upper knife 81 and the slitter lower knife 82 are moved on the left side of FIG. 6. At this time, since the slitter lower knife 82 is on the upstream side in the moving direction with respect to the slitter upper knife 81, the slitter lower knife 82 on the upstream side is positioned at the cutting position. On the other hand, when the cutting position is on the right side of FIG. 6 with respect to the current positions of the slitter upper knife 81 and the slitter lower knife 82, the slitter upper knife 81 and the slitter lower knife 82 are moved to the left side of FIG. 6. At this time, since the slitter upper knife 81 is on the upstream side in the moving direction with respect to the slitter lower knife 82, the slitter upper knife 81 on the upstream side is positioned at the cutting position. Further, in the above description, the slitter lower knife 82 is positioned at the cutting position, but the method is not limited to this method. The slitter upper knife 81 may be positioned at the cutting position, and the slitter lower knife 82 may be positioned at the pressing position.

During the cutting work of the corrugated board S by the slitter upper knife 81 and the slitter lower knife 82, the relative positions of the slitter upper knife 81 and the slitter lower knife 82, and the corrugated board S in the width direction E (axial directions of the slotter shafts 85 and 86) may be changed. When the fine adjustment signal (adjustment cutting position) is input from the operation device 152, the control device 151 moves and positions the slitter upper knife 81 and the slitter lower knife 82 to the fine adjustment cutting position while maintaining the pressed state (predetermined pressing torque) between the slitter upper knife 81 and the slitter lower knife 82. In this case, as shown in FIG. 8, when the fine adjustment cutting position is on the left side of FIG. 8, the control device 151 drives and controls the lower drive device 119 based on the fine adjustment cutting position and the current position of the slitter lower knife 82, and drives and controls the upper drive device 99 based on the pressing torque of the slitter upper knife 81. Further, as shown in FIG. 9, when the fine adjustment cutting position is on the right side of FIG. 9, the control device 151 drives and controls the upper drive device 99 based on the fine adjustment cutting position and the current position of the slitter upper knife 81, and drives and controls the lower drive device 119 based on the pressing torque of the slitter lower knife 82.

Further, since the slitter upper knife 81 and the slitter lower knife 82 cut the corrugated board S while rotating in the pressed state with each other, wear occurs in the thickness direction. As described above, the control device 151 drives and controls the lower drive device 119 so that the current position of the slitter lower knife 82 detected by the rotation position detector 163 and the cutting position of the slitter lower knife 82 input from the production management device 154 coincides with each other, and drives and controls the upper drive device 99 so that the pressing torque of the slitter upper knife 81 input from the torque detector 162 is maintained at a predetermined pressing torque. Therefore, when wear occurs in the slitter upper knife 81 or the slitter lower knife 82, the position of the slitter lower knife 82 does not change, and the slitter upper knife 81 moves to the side where the slitter lower knife 82 is pressed by the wear amount.

For example, as shown in FIGS. 5 and 10, the rotation position detectors 161 and 163 detect the rotation angle (rotation position) of each of the motors constituting the upper drive device 99 and the lower drive device 119. The wear amount calculation section 171 calculates the wear amount of the slitter upper knife 81 and the slitter lower knife 82 based on the distance between the position of the slitter upper knife 81 and the position of the slitter lower knife 82. The distance from a predetermined reference position to the position of the slitter upper knife 81 is Ea, and the distance from the predetermined reference position to the position of the slitter lower knife 82 is Eb. When the mating surfaces of the slitter upper knife 81 and the slitter lower knife 82 are worn from each other, the slitter upper knife 81 and the slitter lower knife 82 move to the wear progress positions shown by the two-dotted chain line in FIG. 10. At this time, a difference between a distance Eax from the reference position to the slitter upper knife 81 and the distance Eb from the reference position to the slitter lower knife 82 is the wear amount of the slitter upper knife 81 and the slitter lower knife 82. When the wear amount exceeds a predetermined wear limit distance set in advance, it is determined that the slitter upper knife 81 and the slitter lower knife 82 are worn.

The determination of wear of the slitter upper knife 81 and the slitter lower knife 82 is not limited to the above-mentioned method. For example, as shown in FIGS. 5 and 11, the rotation position detector 161 detects the rotation angle (rotation position) of the motor constituting the upper drive device 99. When wear occurs in the slitter upper knife 81 or the slitter lower knife 82, the motor of the upper drive device 99 rotates in order to maintain a predetermined pressing torque. The rotation position detector 161 is, for example, a rotary encoder, and detects the rotation amount (rotation speed) of the motor. The wear amount calculation section 171 calculates the wear amount of the slitter upper knife 81 and the slitter lower knife 82 based on the movement amount Ex of the slitter upper knife 81 from the initial pressing position. The movement amount Ex of the slitter upper knife 81 from the initial pressing position is proportional to the rotation amount of the motor from the initial pressing position of the slitter upper knife 81. That is, the initial pressing position of the slitter upper knife 81 with respect to the slitter lower knife 82 is a position represented by a solid line in FIG. 11. When the mating surfaces of the slitter upper knife 81 and the slitter lower knife 82 are worn from each other, the slitter upper knife 81 and the slitter lower knife 82 move to the wear progress positions shown by the two-dotted chain lines in FIG. 11. The initial stage at the initial pressing position is the new and wear-free slitter upper knife 81 and slitter lower knife 82, and is the movement amount Ex=0 from the initial pressing position when the new and wear-free slitter upper knife 81 and the slitter lower knife 82 are used for positioning. When the slitter upper knife 81 and the slitter lower knife 82 are used, wear progresses and the movement amount Ex increases. The control device 151 stores and accumulates the movement amount Ex for each job. If the accumulated movement amount Ex of the slitter upper knife 81 exceeds a predetermined wear limit distance set in advance, the wear determination section 172 determines that the slitter upper knife 81 and the slitter lower knife 82 are worn. The wear limit distance is the wear amount at which the slitter upper knife 81 and the slitter lower knife 82 cannot appropriately cut the corrugated board S. Here, the control device 151 lights a replacement lamp of the slitter head 35 or the like to the operator by the display device 153.

When a stop signal is input from the operation device 152 during the cutting work of the corrugated board S by the slitter upper knife 81 and the slitter lower knife 82, as shown in FIG. 6, the control device 151 moves the slitter upper knife 81 located at the pressing position to a retracted position separated from the slitter lower knife 82 by the predetermined gap E1.

[Actions and Effects of the Present Embodiment]

The slitter device according to the first aspect includes the upper slotter shaft (upper rotary shaft) 85 and the lower slotter shaft (lower rotary shaft) 86 that is rotatably supported, the slitter upper knife (upper slitter head) 81 that is integrally rotatably supported by the upper slotter shaft 85, the slitter lower knife (lower slitter head) 82 that is integrally rotatably supported by the lower slotter shaft 86 and is disposed on one side of the lower slotter shaft 86 in the axial direction with respect to the slitter upper knife 81, the upper drive device (upper movement device) 99 that can move the slitter upper knife 81 in the axial direction of the upper slotter shaft 85, the lower drive device (lower movement device) 119 that can move the slitter lower knife 82 in the axial direction of the lower slotter shaft 86, the control device 151 that moves and positions one of the slitter upper knife 81 and the slitter lower knife 82 by any one of the upper drive device 99 and the lower drive device 119 to a preset cutting position, and then moves and positions the other of the slitter upper knife 81 and the slitter lower knife 82 by the other of the upper drive device 99 and the lower drive device 119 to the pressing position where the other thereof is pressed against the one thereof.

In the slitter device according to the first aspect, when the slitter upper knife 81 and the slitter lower knife 82 are positioned at predetermined positions, first, one of the slitter upper knife 81 and the slitter lower knife 82 is moved and positioned to the cutting position by position control, and then the other of the slitter upper knife 81 and the slitter lower knife 82 is moved and positioned to the pressing position to be pressed against the one thereof by torque control. That is, since one of the slitter upper knife 81 and the slitter lower knife 82 is positioned by the position control and the other is positioned by the torque control with respect to the one positioned by the position control, the slitter upper knife 81 and the slitter lower knife 82 can be positioned with high accuracy at predetermined positions. As a result, the positioning accuracy of the slitter head 35 can be improved.

In the slitter device according to the second aspect, when one of the slitter upper knife 81 and the slitter lower knife 82 is moved to the cutting position by any one of the upper drive device 99 and the lower drive device 119, the other of the slitter upper knife 81 and the slitter lower knife 82 is moved by the other of the upper drive device 99 and the lower drive device 119 with a predetermined gap with respect to the one thereof. Therefore, the positioning time of the slitter upper knife 81 and the slitter lower knife 82 can be shortened.

In the slitter device according to the third aspect, the control device 151 moves the other of the slitter upper knife 81 and the slitter lower knife 82 to the pressing position by the other of the upper drive device 99 and the lower drive device 119, and then continues to apply the pressing force by the other of the upper drive device 99 and the lower drive device 119. Therefore, even if the slitter upper knife 81 and the slitter lower knife 82 are worn, the pressing force between the slitter upper knife 81 and the slitter lower knife 82 can be kept constant at all times.

In the slitter device according to the fourth aspect, when the other of the slitter upper knife 81 and the slitter lower knife 82 is moved to the pressing position by the other of the upper drive device 99 and the lower drive device 119, the control device 151 fixes the other of the slitter upper knife 81 and the slitter lower knife 82 at the pressing position. Therefore, the pressing force between the slitter upper knife 81 and the slitter lower knife 82 can be kept constant at all times, and the load torque control in the upper drive device 99 and the lower drive device 119 is not required, and thereby simplification of control can be achieved.

In the slitter device according to the fifth aspect, when the other of the slitter upper knife 81 and the slitter lower knife 82 is moved to the pressing position by the other of the upper drive device 99 and the lower drive device 119, the control device 151 causes the other thereof to come into contact with the one of the slitter upper knife 81 and the slitter lower knife 82 at the cutting position, and then moves the slitter upper knife 81 and the slitter lower knife 82 by a predetermined distance which is set in advance to be fixed. Therefore, the pressing force between the slitter upper knife 81 and the slitter lower knife 82 can be kept constant at all times, and the load torque control in the upper drive device 99 and the lower drive device 119 is not required, and thereby simplification of control can be achieved.

In the slitter device according to the sixth aspect, the control device 151 moves and positions one of the slitter upper knife 81 and the slitter lower knife 82 to the cutting position by any one of the upper drive device 99 and the lower drive device 119 when a slitter preparation signal is input, and moves and positions the other of the slitter upper knife 81 and the slitter lower knife 82 to the pressing position by the other of the upper drive device 99 and the lower drive device 119 when a slitter cutting start signal is input. Therefore, since a predetermined gap is secured between the slitter upper knife 81 and the slitter lower knife 82 until the slitter cutting start signal is input to the control device 151, the load acting on the slitter upper knife 81 and the slitter lower knife 82 can be reduced when not in use, and the durability can be improved.

In the slitter device according to the seventh aspect, when a fine adjustment signal is input during the cutting work of the corrugated board S by the slitter upper knife 81 and the slitter lower knife 82, the control device 151 moves the slitter upper knife 81 and the slitter lower knife 82 by the upper drive device 99 and the lower drive device 119 to position them at fine adjustment positions while maintaining the pressed state between the slitter upper knife 81 and the slitter lower knife 82. Therefore, when it is desired to change the position of the slitter upper knife 81 and the slitter lower knife 82, and the corrugated board S in the width direction E during the cutting work of the corrugated board S, the slitter upper knife 81 and the slitter lower knife 82 can be moved while maintaining the pressed state therebetween. Therefore, it is not necessary to stop the supply of the corrugated board S when the positions of the slitter upper knife 81 and the slitter lower knife 82, and the corrugated board S are changed in the width direction E, and a decrease in the production efficiency of the corrugated board S can be suppressed.

In the slitter device according to the eighth aspect, when a stop signal is input during the cutting work of the corrugated board S by the slitter upper knife 81 and the slitter lower knife 82, the control device 151 moves one of the slitter upper knife 81 and the slitter lower knife 82 located at the pressing position to a retracted position separated from the other thereof by a predetermined distance (predetermined gap) which is set in advance. Therefore, after the stop signal is input to the control device 151, the predetermined gap is secured between the slitter upper knife 81 and the slitter lower knife 82, so that the load acting on the slitter upper knife 81 and the slitter lower knife 82 is released when not in use, and the durability can be improved.

In the slitter device according to the ninth aspect, the upper drive device 99 and the lower drive device 119 each have a servomotor having a lock function, and the control device 151 operates the lock function of the servomotor when the slitter upper knife 81 or the slitter lower knife 82 is moved and positioned to the cutting position. Therefore, the slitter upper knife 81 or the slitter lower knife 82 can appropriately maintain the positioning state of the cutting position.

In the slitter device according to the tenth aspect, rotation position detectors 161 and 163 that detect the rotation angles of the upper drive device 99 and the lower drive device 119 are provided as position detectors for detecting the positions of the slitter upper knife 81 and the slitter lower knife 82, and the control device 151 has a wear amount calculation section 171 that calculates a wear amount of the slitter upper knife 81 or the slitter lower knife 82 based on detection results of the rotation position detectors 161 and 163, and a wear determination section 172 that determines wear by comparing the wear amount calculated by the wear amount calculation section 171 with a preset wear limit amount. Therefore, wear of the slitter upper knife 81 or the slitter lower knife 82 can be detected at an appropriate time, and deterioration of the cutting accuracy of the corrugated board S can be suppressed.

In the slitter device according to the eleventh aspect, the wear amount calculation section 171 calculates a wear amount of the slitter upper knife 81 or the slitter lower knife 82 based on a distance between the position of the slitter upper knife 81 and the position of the slitter lower knife 82. Therefore, the wear amount of the slitter upper knife 81 or the slitter lower knife 82 is calculated with high accuracy.

In the slitter device according to the twelfth aspect, the wear amount calculation section 171 calculates the wear amount of the slitter upper knife 81 or the slitter lower knife 82 based on the movement amount of the slitter upper knife 81 or the slitter lower knife 82 from the initial pressing position. Therefore, the wear amount of the slitter upper knife 81 or the slitter lower knife 82 is calculated with high accuracy.

The positioning method of the slitter head according to the thirteenth aspect includes a step of moving any one of the slitter upper knife 81 and the slitter lower knife 82 in the axial direction of the slotter shafts 85 and 86 to position them at a preset cutting position, and a step of moving the other of the slitter upper knife 81 and the slitter lower knife 82 to the pressing position where the other of the slitter upper knife 81 and the slitter lower knife 82 is pressed against the one thereof to position them at the pressing position. Therefore, one of the slitter upper knife 81 and the slitter lower knife 82 is positioned by the position control, and the other is positioned by the torque control with respect to the one positioned by the position control, so that the slitter upper knife 81 and the slitter lower knife 82 can be positioned at predetermined positions with high accuracy. As a result, the positioning accuracy of the slitter head 35 can be improved.

The box making machine according to the fourteenth aspect includes the sheet feeding section 11, the printing section 21, the slotter creaser section 31, the die cutting section 41, the folding section 51, and the counter-ejector section 61, and the slitter device 32 is provided in the slotter creaser section 31. Therefore, in the slotter creaser section 31, one of the slitter upper knife 81 and the slitter lower knife 82 is positioned by the position control, and the other is positioned by the torque control with respect to the one positioned by the position control, so that the slitter upper knife 81 and the slitter lower knife 82 can be positioned at predetermined positions with high accuracy. Therefore, the positioning accuracy of the slitter head 35 can be improved, and the quality of the corrugated board S can be improved.

In the above-described embodiments, the box making machine 10 includes the sheet feeding section 11, the printing section 21, the slotter creaser section 31, the die cutting section 41, the folding section 51, and the counter-ejector section 61, but is not limited thereto. For example, the presence or absence of the printing section 21, the die cutting section 41, the folding section 51, and the counter-ejector section 61 is not limited.

REFERENCE SIGNS LIST

10 box making machine
11 sheet feeding section
21 printing section
31 slotter creaser section
32 slitter device
33 first creasing line roll
34 second creasing line roll
35 slitter head
36 slotter head
41 die cutting section
51 folding section
61 counter-ejector section
71, 73 creasing line roll main body
72, 74 receiving roll
75, 77 lower roll shaft
76, 78 upper roll shaft
81 slitter upper knife (upper slitter head)
82 slitter lower knife (lower slitter head)
83 upper slotter head
84 lower slotter head
85 upper slotter shaft (upper rotary shaft)
86 lower slotter shaft (lower rotary shaft)
87 first slotter knife
88 second slotter knife
91, 92, 93, 94 upper movement shaft (upper movement device)
95, 96, 97, 98 upper movement frame
99, 100, 101, 102 upper drive device (upper movement device)
123 drive device
111, 112, 113, 114 lower movement shaft (lower movement device)
115, 116, 117, 118 lower movement frame
119, 120, 121, 122 lower drive device (lower movement device)
151 control device
152 operation device
153 display device
154 production management device

161, 163 rotation position detector
162, 164 torque detector
171 wear amount calculation section
172 wear determination section
S corrugated board (sheet)
B corrugated box

The invention claimed is:

1. A slitter device, comprising:
an upper rotary shaft and a lower rotary shaft that are rotatably supported;
an upper slitter head that is integrally rotatably supported by the upper rotary shaft;
a lower slitter head that is integrally rotatably supported by the lower rotary shaft and is disposed on one side of the lower rotary shaft in an axial direction with respect to the upper slitter head;
an upper movement shaft being parallel to the upper rotary shaft;
a lower movement shaft being parallel to the lower rotary shaft;
an upper movement frame extending perpendicularly to the upper rotary shaft, wherein an upper end portion of the upper movement frame is screwed to the upper movement shaft, and a lower end portion of the upper movement frame is configured to support the upper slitter head;
a lower movement frame extending perpendicularly to the lower rotary shaft, wherein a lower end portion of the lower movement frame is screwed to the lower movement shaft, and an upper end portion of the lower movement frame is configured to support the lower slitter head;
an upper movement device including
the upper movement shaft, and
an upper drive device configured to move the upper slitter head in the axial direction of the upper rotary shaft via the upper movement frame;
a lower movement device including
the lower movement shaft, and
a lower drive device configured to move the lower slitter head in the axial direction of the lower rotary shaft via the lower movement frame; and
a control device configured to
move and position one of the upper slitter head and the lower slitter head to a preset cutting position by any one of the upper movement device and the lower movement device,
then move and position the other of the upper slitter head and the lower slitter head to a pressing position where the other of the upper slitter head and the lower slitter head is pressed against the one of the upper slitter head and the lower slitter head by the other of the upper movement device and the lower movement device, wherein
when a slitter preparation signal is input, the control device
moves the one of the upper slitter head and the lower slitter head to the cutting position along an axial direction of the one of the upper movement shaft and the lower movement shaft by any one of the upper movement device and the lower movement device, and positions and stops the one of the upper slitter head and the lower slitter head in the cutting position, and
moves the other of the upper slitter head and the lower slitter head to a cutting position side along an axial direction of the other of the upper movement shaft and the lower movement shaft by the other of the upper movement device and the lower movement device, and stops the other of the upper slitter head and the lower slitter head with a predetermined gap with respect to the one thereof;
when a slitter cutting start signal is input, the control device
moves the other of the upper slitter head and the lower slitter head to the pressing position along the axial direction of the other of the upper movement shaft and the lower movement shaft by the other of the upper movement device and the lower movement device, positions and stops the other of the upper slitter head and the lower slitter head in the pressing position, and starts cutting work of a corrugated board; and
when the one of the upper slitter head and the lower slitter head is moved to the cutting position along the axial direction of the one of the upper movement shaft and the lower movement shaft by any one of the upper movement device and the lower movement device, the control device
moves the other of the upper slitter head and the lower slitter head by the other of the upper movement device and the lower movement device with a predetermined gap along the axial direction of the one of the upper movement shaft and the lower movement shaft with respect to the one thereof.

2. The slitter device according to claim 1,
wherein the control device moves the other of the upper slitter head and the lower slitter head to the pressing position by the other of the upper movement device and the lower movement device, and then continues to apply a pressing force by the other of the upper movement device and the lower movement device.

3. The slitter device according to claim 1,
wherein when the other of the upper slitter head and the lower slitter head is moved to the pressing position by the other of the upper movement device and the lower movement device, the control device fixes the other of the upper slitter head and the lower slitter head at the pressing position.

4. The slitter device according to claim 1,
wherein when the other of the upper slitter head and the lower slitter head is moved to the pressing position by the other of the upper movement device and the lower movement device, the control device causes the other of the upper slitter head and the lower slitter head to come into contact with the one of the upper slitter head and the lower slitter head at the cutting position, and then moves the other of the upper slitter head and the lower slitter head by a predetermined distance which is set in advance to be fixed.

5. The slitter device according to claim 1, wherein when a fine adjustment signal is input during cutting work of a sheet material by the upper slitter head and the lower slitter head, the control device moves the upper slitter head and the lower slitter head by the upper movement device and the lower movement device to position the upper slitter head and the lower slitter head at fine adjustment positions while maintaining a pressed state between the upper slitter head and the lower slitter head.

6. The slitter device according to claim 1,
wherein when a stop signal is input during cutting work of a sheet material by the upper slitter head and the lower slitter head, the control device moves the one of the upper slitter head and the lower slitter head located at the pressing position to a retracted position separated from the other of the upper slitter head and the lower slitter head by a predetermined distance which is set in advance.

7. The slitter device according to claim 1, wherein the upper movement device and the lower movement device each have a servomotor having a lock function, and the control device operates the lock function of the servomotor when the upper slitter head or the lower slitter head is moved and positioned to the cutting position.

8. The slitter device according to claim 1, further comprising:

a position detector that detects a position of at least the one of the upper slitter head and the lower slitter head, wherein the control device has a wear amount calculation section that calculates a wear amount of the upper slitter head or the lower slitter head based on a detection result of the position detector, and a wear determination section that determines wear by comparing the wear amount calculated by the wear amount calculation section with a preset wear limit amount.

9. The slitter device according to claim 8, wherein the wear amount calculation section calculates a wear amount of the upper slitter head or the lower slitter head based on a distance between positions of one and the other of the upper slitter head and the lower slitter head.

10. The slitter device according to claim 8, wherein the wear amount calculation section calculates the wear amount of the upper slitter head or the lower slitter head based on a movement amount of the upper slitter head or the lower slitter head from an initial pressing position.

11. A box making machine comprising:

a sheet feeding section that supplies a sheet;

a printing section that performs printing on the sheet;

a slotter creaser section that performs an end portion cutting process, a creasing line process, and a groove cutting process on the sheet;

a folding section that forms a box body by folding the sheet and joining end portions; and a counter-ejector section that discharges every predetermined number of the box bodies after stacking the box bodies while counting the box bodies, wherein the slotter creaser section has the slitter device according to claim 1.

* * * * *